United States Patent
May

(10) Patent No.: US 9,445,546 B2
(45) Date of Patent: *Sep. 20, 2016

(54) SHOE LOAD AND DISTRIBUTION SENSING FOR COMBINE HARVESTER

(71) Applicant: AGCO Corporation, Hesston, KS (US)

(72) Inventor: Craig C. May, Park City, KS (US)

(73) Assignee: AGCO Corporation, Duluth, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/561,695

(22) Filed: Dec. 5, 2014

(65) Prior Publication Data

US 2015/0156971 A1   Jun. 11, 2015

Related U.S. Application Data

(60) Provisional application No. 61/912,168, filed on Dec. 5, 2013.

(51) Int. Cl.
   *A01D 41/12*   (2006.01)
   *A01D 75/28*   (2006.01)
   *A01D 41/127*  (2006.01)

(52) U.S. Cl.
   CPC ......... *A01D 75/282* (2013.01); *A01D 41/1276* (2013.01)

(58) Field of Classification Search
   CPC ........... A01D 41/127; A01D 41/1271; A01D 41/1276; A01D 75/282; A01F 12/52; A01F 12/442
   USPC ......... 56/10.2 A–10.2 C, 10.2 R; 460/1, 4–7; 701/28, 31, 47, 48, 50
   See application file for complete search history.

(56) References Cited

U.S. PATENT DOCUMENTS

| 4,270,551 A | 6/1981 | Johnston et al. | |
| --- | --- | --- | --- |
| 4,360,998 A | 11/1982 | Somes | |
| 4,441,513 A * | 4/1984 | Herwig | A01D 41/127 250/223 R |
| 4,573,483 A | 3/1986 | Raineri | |
| 4,627,446 A | 12/1986 | Huhman | |
| 4,934,985 A | 6/1990 | Strubbe | |
| 5,769,712 A | 6/1998 | Honas | |
| 6,119,442 A * | 9/2000 | Hale | A01D 41/127 56/10.2 H |
| 6,442,916 B1 | 9/2002 | Pope | |
| 6,591,145 B1 * | 7/2003 | Hoskinson | A01D 41/127 460/1 |
| 7,367,880 B2 * | 5/2008 | Hoskinson | A01D 41/1271 460/4 |
| 7,846,013 B1 | 12/2010 | Diekhans | |
| 2002/0091476 A1 | 7/2002 | Beck | |
| 2003/0172636 A1 | 9/2003 | Clauss | |
| 2004/0226275 A1 | 11/2004 | Baumgarten | |
| 2012/0004812 A1 * | 1/2012 | Baumgarten | A01D 41/127 701/50 |
| 2013/0172057 A1 * | 7/2013 | Farley | A01D 75/282 460/5 |
| 2014/0335923 A1 | 11/2014 | Biggerstaff et al. | |

FOREIGN PATENT DOCUMENTS

| FR | 2614497 A1 | 11/1988 |
| --- | --- | --- |
| JP | H1084758 A | 3/1989 |
| WO | 02/074061 A1 | 9/2002 |

OTHER PUBLICATIONS

International Property Office, Search Report for UK Patent Application No. GB1403569.5, dated Aug. 21, 2014.

Intellectual Property Office, Supplemental International Search Report (Claims 12-18) for UK Patent Application No. GB1403569.5, dated Feb. 27, 2015.

* cited by examiner

*Primary Examiner* — Robert Pezzuto

(57) ABSTRACT

In one embodiment, a combine harvester sensing system comprising a shoe; a thresher rotor; and a sensor disposed between the shoe and the thresher rotor, the sensor configured to sense crop material discharged from the thresher rotor and impacting the shoe.

11 Claims, 8 Drawing Sheets

United States Patent US 9,445,546 B2

SHOE LOAD AND DISTRIBUTION SENSING FOR COMBINE HARVESTER

CROSS REFERENCE TO RELATED APPLICATION

This application claims the benefit of U.S. Provisional Application No. 61/912,968 filed Dec. 5, 2013, which is hereby incorporated by reference in its entirety.

TECHNICAL FIELD

The present disclosure is generally related to agriculture technology, and, more particularly, combine harvesters.

BACKGROUND

Combine harvesters are provided with a processing system comprising a thresher rotor assembly and cleaning system. The thresher rotor assembly typically comprises a thresher rotor or cylinder and one or more arcuate, foraminous concaves and separator grate assemblies, through which crop material threshed by the thresher rotor pass to the cleaning system. The threshed crop material may comprise kernels of grain, chaff, small pieces of stalk or straw, etc. The cleaning system is used to remove chaff and other residue from, for instance, the threshed grain. Within the cleaning system, an oscillating grain or cascade pan and sieve assemblies of a shaker shoe assembly (hereinafter, also simply shoe) in conjunction with air flow remove the chaff from the threshed grain. The cleaned grain is conveyed to a discharge auger that elevates the grain to an onboard storage bin, whereas material other than grain (or MOG) and possibly unthreshed grain is directed over the edge of a bottom sieve assembly of the shoe to a different discharge outlet for recirculation back through the thresher rotor assembly and cleaning system to extract any unthreshed grain. A fan of the cleaning system produces an airstream through the shoe that entrains the lighter non-grain particles and carries them out the rear of the combine harvester. The versatility of the combine harvester enables harvesting of many different crops under a variety of conditions. In turn, the variability in crops and conditions may provide challenges to combine harvester operations that affect the capacity of the shoe.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1:
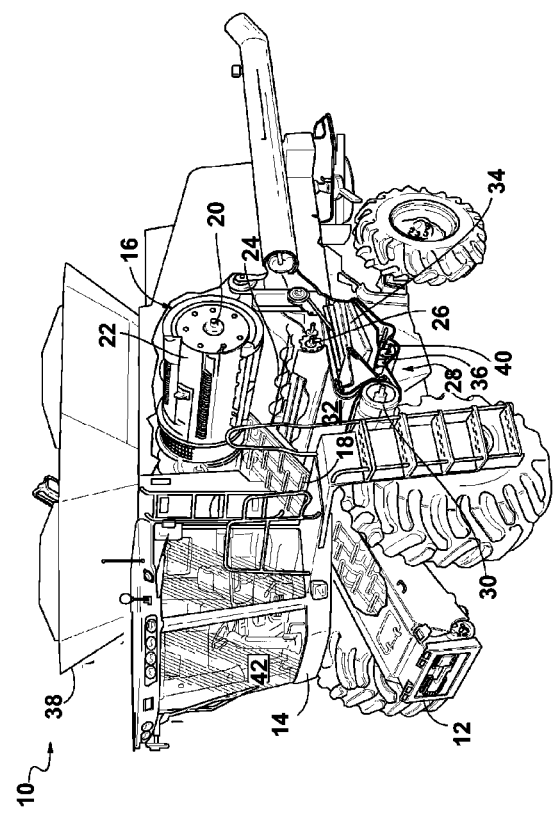
FIG. 1 is a schematic diagram, in partial cutaway view, of an example combine harvester showing an embodiment of a combine harvester sensing system.

In one embodiment, a combine harvester sensing system comprising a shoe; a thresher rotor; and a sensor disposed between the shoe and the thresher rotor, the sensor configured to sense crop material discharged from the thresher rotor and impacting the shoe.

Detailed Description

Certain embodiments of a combine harvester sensing system and method are disclosed that address the variability in crop material and/or environmental conditions involved in farming with a combine harvester by monitoring the manner in which threshed crop material is distributed on a shaker shoe assembly (hereinafter, simply shoe). In one embodiment, one or more sensors are mounted in between a set of accelerator rolls and a pan of the shoe, wherein the threshed crop material that flows between these components is sensed and operations of the combine harvester are adjusted (e.g., automatically or with operator intervention) based on signaling from the one or more sensors. For instance, the operations that are adjusted may include a gap adjustment between a concave and the thresher rotor, and/or speed of thresher rotor rotation (and/or driving speed), among other adjustments.

As is known, equal loading of the shoe is difficult to achieve due to the variability of crops and/or conditions (e.g., environmental conditions, including terrain, weather, etc.). Prior efforts to address loading include observing paint-wear patterns in the shoe, yet such measures only provide a general idea of shoe loading and lack any real-time value. By sensing the shoe load (including distribution of the shoe load) and effecting adjustments in the combine harvester operations to even out (e.g., distribute the crop material that impacts the shoe more evenly) the shoe load distribution, combine harvester capacity may be increased. Further, the active sensing provides a real-time solution for assessing the shoe load in a variety of crops and/or conditions.

Having summarized certain features of combine harvester sensing systems of the present disclosure, reference will now be made in detail to the description of the disclosure as illustrated in the drawings. While the disclosure will be described in connection with these drawings, there is no intent to limit it to the embodiment or embodiments disclosed herein. For instance, in the description that follows, one focus is on a combine harvester having a transverse-rotor design, though it should be appreciated within the context of the present disclosure that combine harvesters of other designs, such as hybrid, conventional, axial, or dual axial, may be used and hence are contemplated to be within the scope of the present disclosure. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the combine harvester looking forwardly. In addition, note that reference herein to threshed crop material refers to crop material that has been processed by the thresher rotor, which may (or may not) include at least a small portion of unthreshed grain.

Referring now to FIG. 1, shown is an example combine harvester 10 in which an embodiment of a combine harvester sensing system may be implemented. It should be understood by one having ordinary skill in the art, in the context of the present disclosure, that the example combine harvester 10 shown in FIG. 1 is merely illustrative, and that other combine configurations may be implemented in some embodiments. The example combine harvester 10 is shown in FIG. 1 without a header, and from front to back, comprises a feeder house 12 and an operator cab 14, followed by a processing compartment that includes a processing system 16. In operation, the combine harvester 10 includes a harvesting header (not shown) at the front of the machine that cuts crop materials and delivers the cut crop materials to the front end of the feeder house 12. Such crop materials are moved upwardly and rearwardly within and beyond the feeder house 12 by a conveyor 18 until reaching a thresher rotor assembly comprising a thresher rotor (or cylinder) 20 of the processing system 16. The thresher rotor 20 comprises a single, transverse rotor, such as that found in a Gleaner® Super Series Combine by AGCO. The thresher rotor 20 processes the crop materials in known manner and passes a portion of the crop material (e.g., heavier chaff, corn stalks, etc.) toward the rear of the combine harvester 10 and another portion (e.g., threshed crop material such as grain and possibly light chaff) through well-known arcuate, foraminous concaves and separator grate assemblies to a cleaning system, as described below. In some embodiments, such as in axial flow designs, the conveyor 18 may convey the cut crop material to a beater before reaching a rotor or rotors.

In the processing system 16, the crop materials undergo threshing and separating operations. In other words, the crop materials are threshed and separated by the thresher rotor 20 operating in cooperation with certain elements of the thresher rotor assembly, including a rotor cage 22, which includes well-known foraminous processing members in the form of threshing concave assemblies and separator grate assemblies; with the grain (and possibly light chaff) escaping through the concave assemblies (which may include a plurality of coupled, modular-structured concaves) and the grate assemblies and onto one or more (e.g., two shown, but the quantity may be greater or fewer in some embodiments) distribution augers 24 located beneath the processing system 16.

Bulkier stalk and leaf materials are generally retained by the concave assemblies and the grate assemblies and are disbursed out from the processing system 16 and ultimately out of the rear of the combine harvester 10. The distribution augers 24 uniformly spread the crop material that falls upon it, with the spread crop material conveyed to plural (e.g., two, but the quantity may be greater or fewer in some embodiments) accelerator rolls 26. The accelerator rolls 26 speed the descent of the threshed crop material (e.g., propel it) toward a cleaning system 28. Also shown is a transverse, air blowing apparatus 30 (e.g., fan, or equivalently, a blower), which discharges pressurized air through one or more ducts, such as ducts 32 (e.g., which in one embodiment, includes an upper duct and lower duct, as explained below, though not limited to two ducts), to the cleaning system 28 to facilitate the cleaning of the heavier crop material directly beneath the accelerator rolls 26 while causing the chaff to be carried out of the rear of the combine harvester 10. The cleaning system 28 includes a shoe comprising plural stacked sieves 34 (e.g., also referred to herein as an oscillating sieve assembly), through which the fan 30 provides an additional push or influence (through a lower duct 32) of the chaff flow to the rear of the combine harvester 10. The cleaned grain that drops to the bottom of the cleaning system 28 is delivered by an auger 36 that transports the grain to a well-known elevator mechanism (not shown), which conveys the grain to a grain bin 38 located at the top of the combine harvester 10. Any remaining chaff and partially or unthreshed grain is recirculated through the processing system 16 via a tailings return auger 40. As combine processing is known to those having ordinary skill in the art, further discussion of the same is omitted here for brevity.

The example combine harvester 10 also comprises a controller 42 (shown schematically). Though depicted in the operator cab 14, the controller 42 may be located elsewhere on the combine harvester 10 in some embodiments. In one embodiment, the controller 42 may receive a signal or signals from one or more sensors of a combine harvester sensing system that sense the crop material discharged from the accelerator rolls 26 and, automatically, or in some embodiments with operator intervention, adjusts (including causing the adjustment of) one or more combine harvester operations to ensure uniform shoe load distribution.

Figure 2:
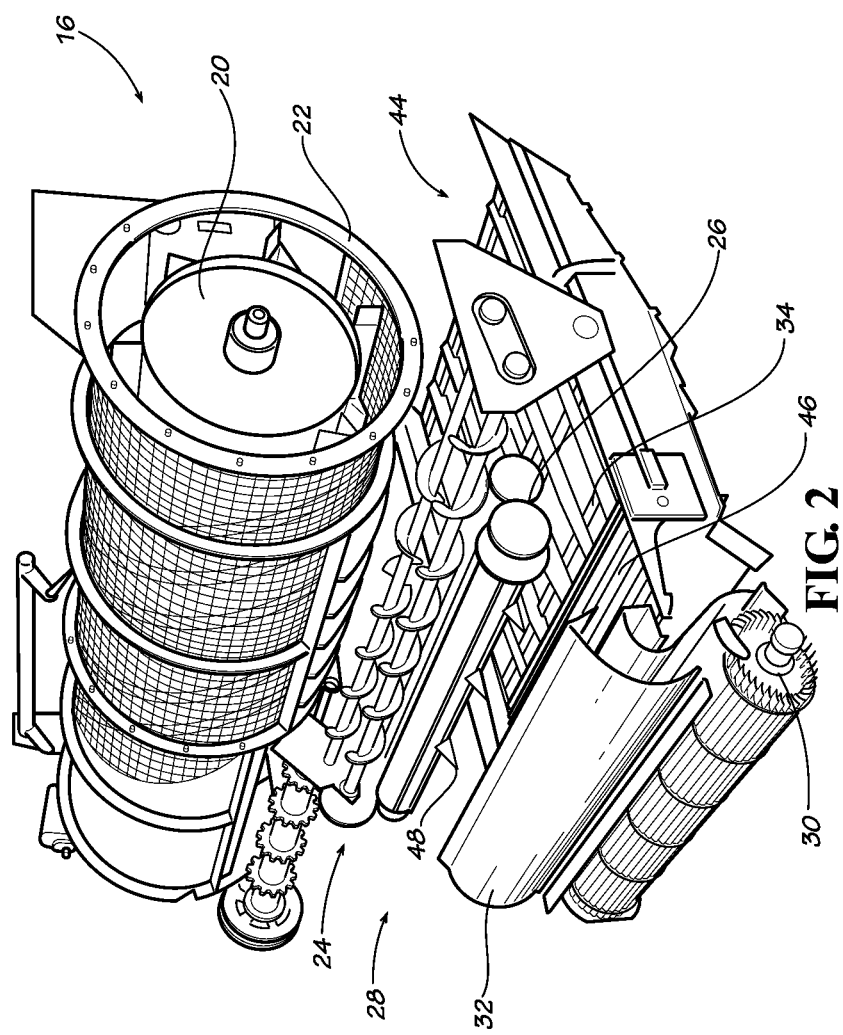
FIG. 2 is a schematic diagram in a fragmentary, front perspective view of a thresher rotor assembly and shoe with an embodiment of a combine harvester sensing system.

FIG. 2 is a fragmentary view of the processing system 16 and cleaning system 28 of FIG. 1, which provides a perspective of one example arrangement relative to sensors of an embodiment of the combine harvester sensing system. It should be appreciated within the context of the present disclosure that some embodiments may include additional components or fewer or different components, and that the example depicted in FIG. 2 is merely illustrative of an example environment in which an embodiment of a combine harvester sensing system may be implemented. Starting from the top, shown is the thresher rotor 20 of the processing system 16, the thresher rotor 20 surrounded and supported by the rotor cage 22. The plural distribution augers 24 are disposed beneath the thresher rotor 20, and disposed beneath the distribution augers 24 are the plural accelerator rolls 26. Also shown is the cleaning system 28, which includes in one embodiment the fan 30, duct 32, and a shoe 44. The shoe 44 includes the oscillating sieve assembly 34, which in one embodiment includes a pan (e.g., grain or cascade pan) 46 which provides a target area for the initial deposit of the threshed crop material. Oscillating movement of the pan 46 causes the conveyance rearward of the threshed crop material to other oscillating part of the shoe 44. In one embodiment, plural sensors 48 (three (3) depicted schematically in FIG. 2) are disposed between the accelerator rolls 26 and the shoe 44. In the embodiment depicted in FIG. 2, three sensors 48 are shown, though fewer or greater quantities of sensors may be disposed between the accelerator rolls 26 and the shoe 44. In one embodiment, each of the sensors 48 may be of the same type, though some embodiments may use sensors of different types. In the embodiment depicted in FIG. 2, the sensors 48 are each embodied as load sensing bars that are exposed to the stream of threshed crop material that exists between the accelerator rolls 26 and the pan 46. Although the sensors 48 are illustrated as contact-type sensors (e.g., the crop material contacts the sensors 48), in some embodiments, the sensors 48 may be non-contact (i.e., not contact the threshed crop material), such as acoustic sensors, capacitive and/or magnetic sensors, infrared sensors, or sensors that operate under other electromagnetic spectrums, among other types of sensors that can detect the crop material.

Figure 3:
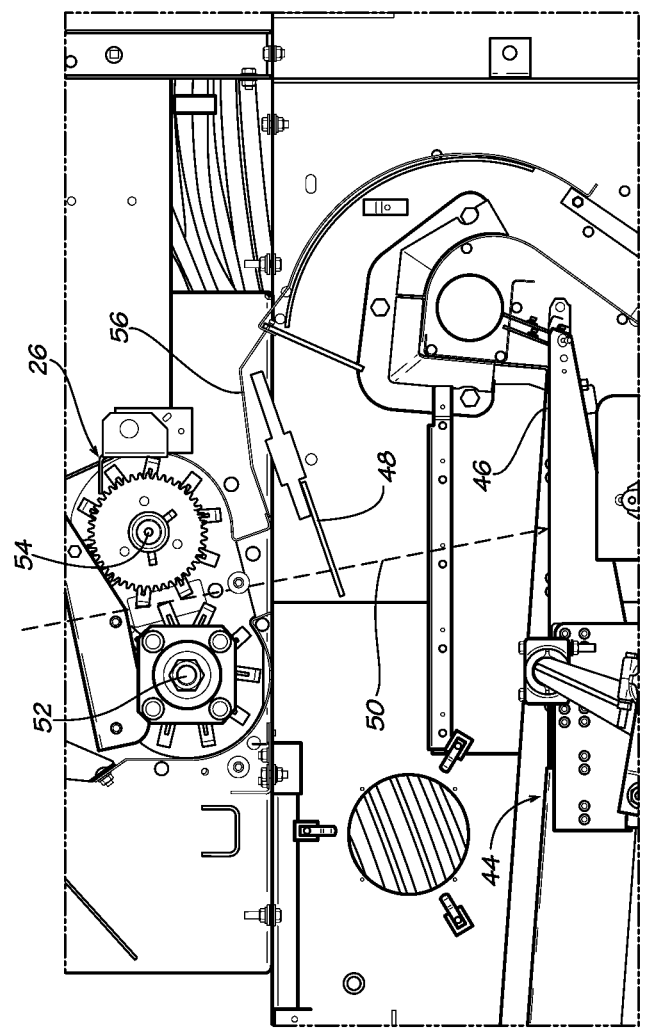
FIG. 3 is a schematic diagram in a fragmentary, side elevation showing one example arrangement of a sensor of an embodiment of a combine harvester sensing system relative to a set of accelerator rolls and a pan of the shoe.

Referring now to FIG. 3, shown is a fragmentary, side-elevation view of certain components of the combine harvester 10 (FIG. 1) involved in the conveyance of a stream of threshed crop material and sensing of the same. It should be appreciated within the context of the present disclosure that some embodiments may include additional components or fewer or different components, and that the example depicted in FIG. 3 is merely illustrative of one embodiment among others. The select components of the combine harvester 10 depicted in FIG. 3 include the plural accelerator rolls 26, the sensor 48, and the pan 46 of the shoe 44 (which extends rearward, which is to the left in FIG. 3). A stream or flow of threshed crop material is graphically represented in FIG. 3 with a dashed line with arrowhead and denoted with reference numeral 50. Reference numerals 52 and 54 correspond to the respective axis of each accelerator roll of the pair of accelerator rolls 26, the axes in this example running into and out of the page. In an example operation, one embodiment of combine harvester sensing system comprises the sensor 48 extending (at least partially) into the flow 50 of threshed crop material as the crop material is propelled from in between the accelerator rolls 26 and impacts the pan 46. It should be understood that there may be plural sensors, including sensor 48, disposed transversely (i.e., into and out of the page) to the direction of movement of the combine harvester 10. In one embodiment, each sensor 48 is located substantially equidistant, relative to one another, from the axes 52 and 54 of the accelerator rolls 26. In some embodiments, the sensors 48 may each be located differently from the axes 52 and 54 relative to one another. In some embodiments, the sensors 48 may be substantially equidistant relative to one another from an axis of the thresher rotor 20 (FIG. 1). In one embodiment, a single sensor unit may be used to detect the crop material and enable a determination of shoe load distribution. For instance, a single sensor unit may comprise a single rod with fingers extending therefrom transversely along the width of the combine harvester 10, enabling detection of the flow of threshed crop material over several locations along the width of the pan 46. In some embodiments, a single acoustic sensor or image sensor (e.g., or other electromagnetic spectrum sensor) may detect the flow over a wide area, likewise enabling a determination of the shoe load distribution.

In one embodiment, the sensors 48 are secured to the frame via sheet metal 56 that is located above the sensors 48 and in one embodiment secured to opposing sides of the frame of the combine harvester 10. The sensors 48 are depicted in FIG. 3 as located proximal to, and beneath, the accelerator rolls 26. In other words, the sensors 48 in this example are located closer to the accelerator rolls 26 than to the pan 46. In some embodiments, the sensors 48 may be disposed closer to the pan 46 than to the accelerator rolls 26. In some embodiments, each sensor 48 may be located midway between the accelerator rolls 26 and the pan 46. The sensors 48 detect the crop material in the flow 50, and each communicates (e.g., via wireless or wired connections) a signal to a controller 42 (FIG. 1). Note that communication may be implemented through one or more intermediary devices (e.g., signal processing devices, switches, communication devices, etc.) in some embodiments. In one embodiment, the controller 42 in turn communicates (e.g., via a wireless and/or wired medium) a signal or signals (e.g., provides feedback) to a user interface (e.g., display screen, though may be a headset display, ear phones, speaker, etc. in some embodiments) in the cab 14 (FIG. 1) or remotely in some embodiments. The signal may be used to display a graphic that shows (e.g., using bar graphs, numeric values, etc.) the shoe load distribution, enabling and/or prompting the operator to manipulate one or more combine harvester operator controls (e.g., joystick, buttons, switches, GUI menu items selected via cursor maneuvered by a mouse or other input device, or controls selected by voice activation or selected directly via touchscreen) based on the graphic to cause the shoe load distribution to change and become more evenly distributed on the shoe 44.

For instance, the graphic may illustrate three bars corresponding to the three (3) sensors 48 depicted in FIG. 2, with the height of each bar corresponding to the amount of threshed crop material sensed in the respective flow region (and accordingly, providing an indication of the shoe load distribution). Variations (or in some embodiments, threshold variations) in the height or height ranges among the three bars may indicate the need for adjustments to one or more combine harvester operations to even-out or substantially evenly distribute the shoe load. As indicated previously, the operator controls may be used to change the thresher rotor speed, concave clearance, vehicle speed, among others changes that can cause a change in the manner in which the threshed crop material impacts the pan 46 (e.g., to cause a change in shoe load distribution).

In some embodiments, the controller 42 (FIG. 1) may automatically be triggered by the signals from the sensors 48 to cause changes to one or more operations of the combine harvester 10 (FIG. 1) to change the shoe load distribution. In some embodiments, a semi-automatic mechanism may be employed, whereby the controller 42 provides feedback to a user interface, yet the controller 42, through the user interface, prompts the operator to make recommended or suggested (e.g., as displayed) or non-displayed changes (e.g., that are put into effect by the controller 42). For instance, the user interface may merely show the graphic, and the operator decides whether or not to take action. In some embodiments, the controller 42 causes the display (or otherwise, makes corresponding information known to the operator) of the changes to combine harvester operations the controller 42 intends to actuate, yet permits the operator to approve or deny (or modify) such changes. One or more of these and/or other mechanisms for providing feedback to an operator and/or taking remedial measures to change the shoe load distribution may be implemented in a given scenario.

Though described in the context of an operator in a cab 14 (FIG. 1) of the combine harvester 10 (FIG. 1), it should be appreciated that the operator and/or user interface may be located remotely, wherein the combine harvester 10 communicates the signal(s) wirelessly, such as via a cellular phone system, the Internet, radio frequency propagation, among other mechanisms for relaying information remotely.

Figure 4:
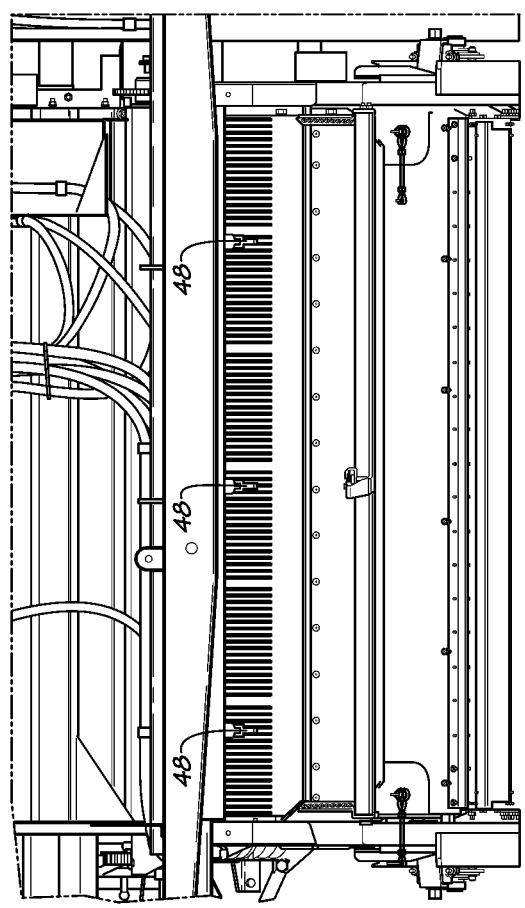
FIG. 4 is a schematic diagram in a fragmentary, rear elevation view showing plural sensors of an embodiment of a combine harvester sensing system.

FIG. 4 shows a rear, fragmentary view of the combine harvester 10, illustrating one example arrangement of the plural sensors 48.

Figure 5A:
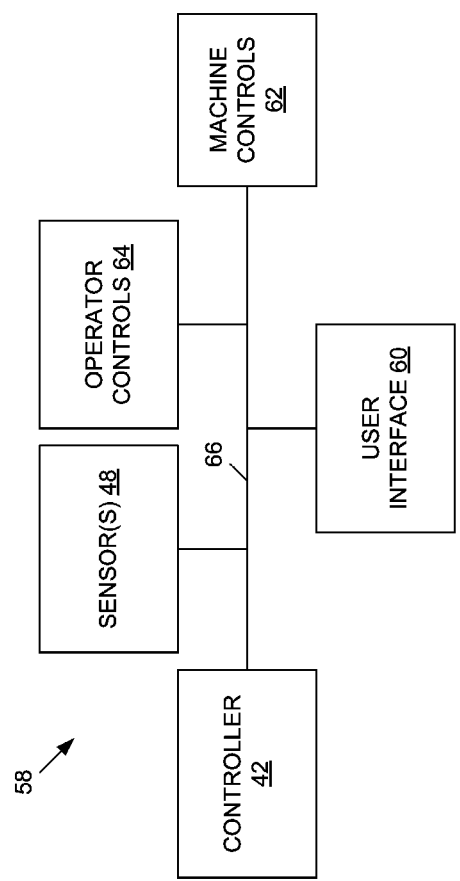
FIGS. 5A-5B are block diagrams that illustrate an embodiment of a control system and computing system for an embodiment of a combine harvester sensing system.

Having described some select components of example embodiments of a combine harvester sensing system, attention is now directed to FIG. 5A. FIG. 5A shows an embodiment of a control system 58 for an embodiment of a combine harvester sensing system. It should be appreciated within the context of the present disclosure that some embodiments may include additional components or fewer or different components, and that the example depicted in FIG. 5A is merely illustrative of one embodiment among others. In one embodiment, the control system 58 comprises the combine harvester sensing system. In some embodiments, the combine harvester sensing system may comprise fewer or additional components that those depicted in FIG. 5A. The control system 58 includes the controller 42, a user interface 60, machine controls 62, operator controls 64, and one or more sensors 48, wherein these components are coupled to each other via a network 66. For instance, the controller 42 may be coupled in a CAN network 66 (though not limited to a CAN network or a single network, or to a wired medium) to the user interface 60, machine controls 62, operator controls 64, and the sensors 48. The machine controls 62 collectively comprise the various actuators (e.g., electric, hydraulic, etc.), sensors (excluding sensors 48), and/or controlled devices residing on the combine harvester 10 (FIG. 1), including those used to control machine navigation (e.g., speed, direction, etc.), internal machinery operations (e.g., for processing system adjustments, cleaning system adjustments, etc.), header position and/or control, among others. The user interface 60 may include a speaker, headset, and/or display screen (e.g., liquid crystal diode (LCD), cathode-ray tube (CRT), etc.). The operator controls 64 may include a keyboard, mouse, microphone, touch-type display portion of the display device, and/or other devices (e.g., switches, levers, joystick, etc.) that enable input by an operator (e.g., such as while in the operator cab 14 (FIG. 1)). In some embodiments, the controller 42 provides for the overall management and control of the control system 58, and in some embodiments, two or more of the components (e.g., the sensors 48 and the machine controls 62) may communicate with each other (e.g., in peer-to-peer relationship) without intervention by the controller 42. In some embodiments, operator intervention may be implemented in whole, or in part, or none at all. For instance, the operator may be apprised of a given impending action, providing an opportunity to override the control system 58, or in some embodiments, machine actions may require operator approval, and in some embodiments, feedback of an executed action or sensed event may be provided to the operator via the user interface 60. In some embodiments, one or more actions may occur transparently to the operator.

In one embodiment, the controller 42 receives signals from one or more of the sensors 48, and provides feedback to the operator via the user interface 60. The feedback may be in the form of one or more graphics displayed on a display screen that inform the operator of the presently-sensed shoe load distribution. In some embodiments, the controller 42 may automatically provide signal(s) to the machine controls 62 to cause a change in the combine harvester 10 (FIG. 1), which in turn causes a change in the distribution of the shoe load. As described previously, the controller 42 may signal the machine controls 62 and the user interface 60 to enable operator intervention in the process of causing a change in shoe load distribution.

Figure 5B:
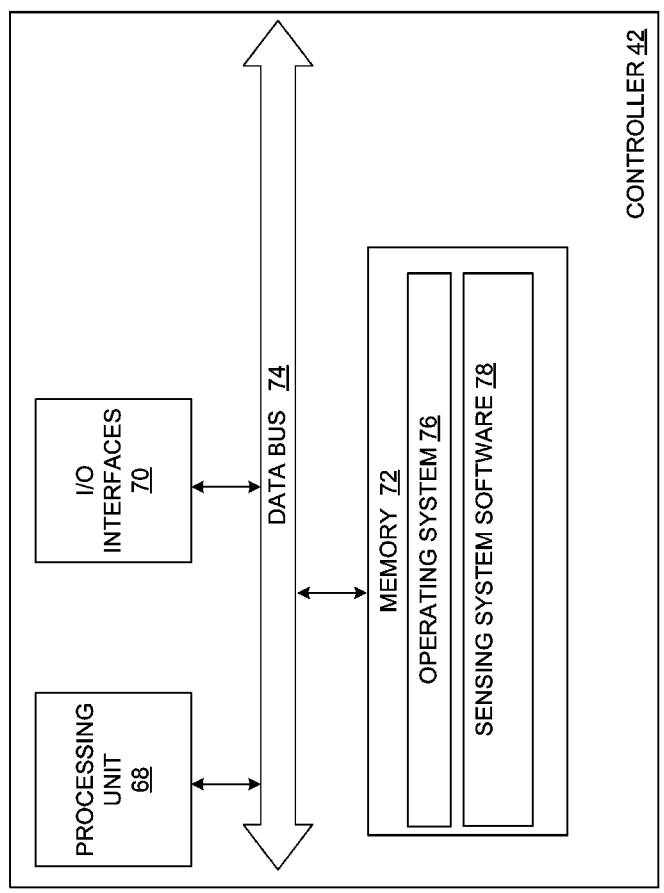

FIG. 5B further illustrates an example embodiment of the controller 42. One having ordinary skill in the art should appreciate in the context of the present disclosure that the example controller 42 is merely illustrative, and that some embodiments of controllers may comprise fewer or additional components, and/or some of the functionality associated with the various components depicted in FIG. 5B may be combined, or further distributed among additional modules, in some embodiments. The controller 42 is depicted in this example as a computer system, but may be embodied as a programmable logic controller (PLC), FPGA, among other devices. It should be appreciated that certain well-known components of computer systems are omitted here to avoid obfuscating relevant features of the controller 42. In one embodiment, the controller 42 comprises one or more processing units (also referred to herein as a processor or processors), such as processing unit 68, input/output (I/O) interface(s) 70, and memory 72, all coupled to one or more data busses, such as data bus 74. The memory 72 may include any one or a combination of volatile memory elements (e.g., random-access memory RAM, such as DRAM, and SRAM, etc.) and nonvolatile memory elements (e.g., ROM, hard drive, tape, CDROM, etc.). The memory 72 may store a native operating system, one or more native applications, emulation systems, or emulated applications for any of a variety of operating systems and/or emulated hardware platforms, emulated operating systems, etc. In the embodiment depicted in FIG. 5B, the memory 72 comprises an operating system 76 and sensing system software 78. It should be appreciated that in some embodiments, additional or fewer software modules (e.g., combined functionality) may be employed in the memory 72 or additional memory. In some embodiments, a separate storage device may be coupled to the data bus 74, such as a persistent memory (e.g., optical, magnetic, and/or semiconductor memory and associated drives).

The sensing system software 78 receives a signal from each sensor 48 (or in some embodiments from a single sensor acting alone or as a master sensor in a master-slave sensor array, where the master sensor comprises intelligence to make a comparison of each sensed value and provide a result), the signal providing an indication of the amount of threshed crop material that is sensed. The amount may be in the form of density, force, among other parameters, that directly or indirectly (e.g., through one or more algorithms providing such a translation) provide an indication as to how much threshed crop material is ultimately received on the shoe 44 in a given area. For instance, a sensor 48 located to the left in the area above the pan 46 (FIG. 3) senses the amount of threshed crop material that is destined to impact the area of the shoe 44 (e.g., the pan 46) located substantially directly beneath the left hand side sensor 48 (or located in an area designated or programmed to be associated with the sensor). The sensing system software 78 compares the signals received from each sensor 48, and provides a signal to the user interface 60 and/or machine controls 62. For instance, the signal to the user interface 60 may include formatting instructions that enable a graphic to be presented on the user interface 60 that shows the relative differences in shoe load distribution.

Figure 5C:
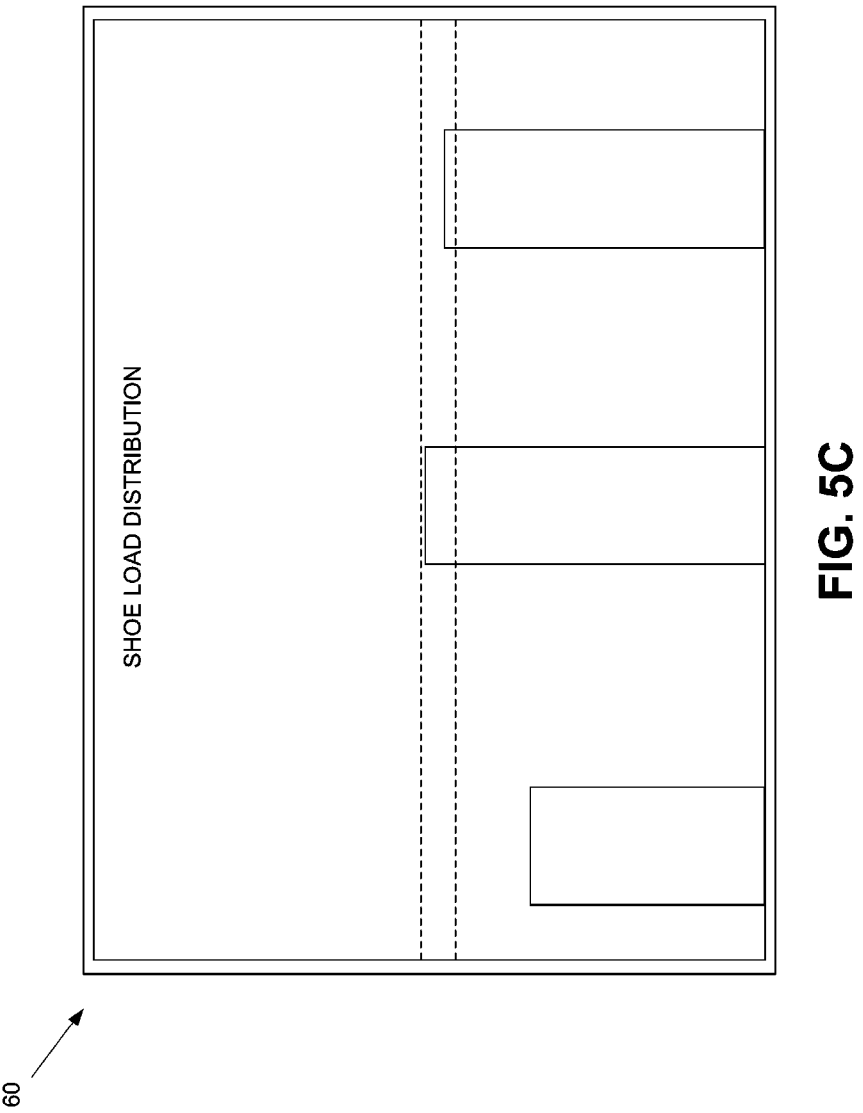
FIG. 5C is a screen diagram that illustrates one example of a user interface embodied as a display screen with a graphic that provides feedback to an operator about a shoe load distribution.

FIG. 5C provides an example of a user interface 60 embodied as a display screen, with a graphic comprising three (3) bars corresponding to shoe load. It should be understood that fewer or more bars may be displayed, which may correspond to the quantity of sensors used in some embodiments. The dashed rectangular box running across the screen is a threshold range. Bar heights that exceed or are located below the threshold range are indicators of uneven shoe loads, and hence remedial measures in the form of adjustments (e.g., with or without operator intervention) should be actuated to even out the shoe load (which should result in the bar heights falling within the threshold range). For instance, the bars on the center and right hand side (e.g., corresponding to the sensors 48 on the center and right hand side above the pan 46 (FIG. 3), respectively) have heights that are within the threshold range (and hence the shoe loads corresponding to these areas are even or substantially even). The bar on the left hand side (e.g., corresponding to the sensor 48 on the left hand side above the pan 46) has a height that is located below the threshold range, indicating that the loading of the shoe on that side is light. To even out the load, one or more combine harvester operations should be changed to cause more discharge of the crop material onto the left hand side (and/or less in the center and right hand side of the shoe). In some embodiments, other mechanisms for providing feedback to an operator may be used, and hence not limited to a visual graphic and/or bar graphic configurations.

The signaling to the machine controls 62 may include instructions to increase or decrease a setting(s) or operating state of the actuated control(s). It should be appreciated that other mechanisms for communicating instructions to one or more devices may be used, and hence are contemplated to be within the scope of the disclosure.

Referring again to FIG. 5B, execution of the sensing system software 78 is implemented by the processing unit 68 under the management and/or control of the operating system 76. In some embodiments, the operating system 76 may be omitted and a more rudimentary manner of control implemented. The processing unit 68 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 42.

The I/O interfaces 70 provide one or more interfaces to the network 66 (FIG. 5A) and other networks. In other words, the I/O interfaces 70 may comprise any number of interfaces for the input and output of signals (e.g., analog or digital data) for conveyance over the network 66. The input may comprise input by an operator (local or remote) through the operator controls 64 (e.g., a keyboard or mouse or other input device (or audible input in some embodiments)), and input from signals carrying information from one or more of the components of the combine harvester 10 (FIG. 1), such as machine controls 62 (FIG. 5A), among other devices.

When certain embodiments of the controller 42 are implemented at least in part with software (including firmware), as depicted in FIG. 5B, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the controller 42 are implemented at least in part with hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 6:
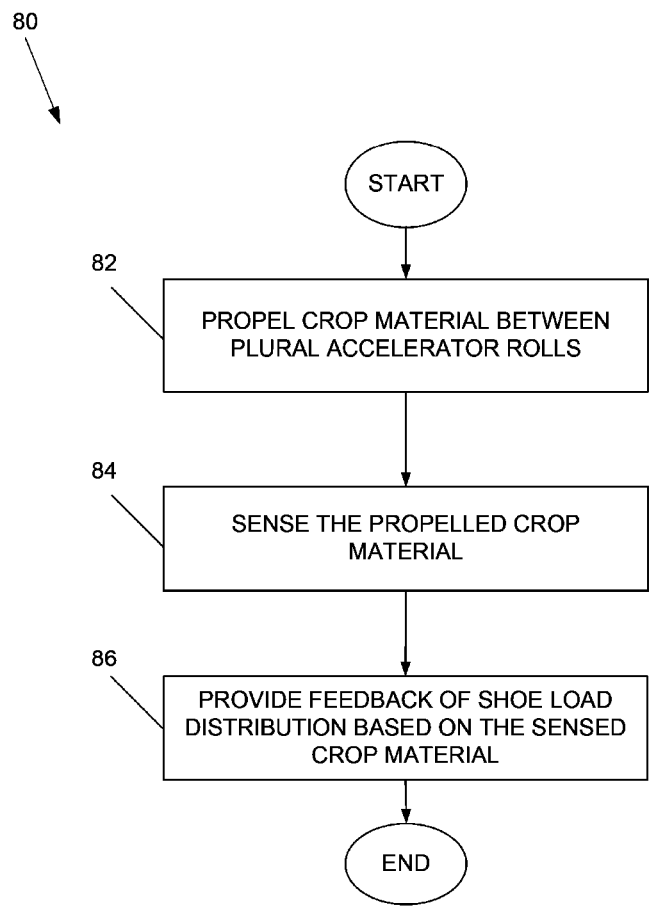
FIG. 6 is a flow diagram that illustrates an embodiment of a combine harvester sensing method.

Having described certain embodiments of a combine harvester sensing system, it should be appreciated within the context of the present disclosure that one embodiment of a combine harvester sensing method, denoted as method 80 as illustrated in FIG. 6, comprises propelling crop material between plural accelerator rolls (82); sensing the propelled crop material (84); and providing feedback of shoe load distribution based on the sensed crop material (86).

Any process descriptions or blocks in flow diagrams may be implemented with additional or fewer process steps in some embodiments, and that the method 80 depicted in FIG. 6 is not limited to the architectures shown in FIGS. 1-5B, as would be understood by those reasonably skilled in the art of the present disclosure.

Note that certain embodiments of combine harvester sensing systems enable a choice of the best configuration of distribution augers in all conditions. For instance, if conditions and crops are too variable, then hydraulically driven distribution augers may be used to react to the changing conditions.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. A combine harvester sensing system for use with a combine harvester, comprising:
   a thresher rotor, the thresher rotor having a transverse rotation axis with respect to a forward direction of travel of the combine harvester;
   plural distribution augers disposed beneath the thresher rotor and being controllable to deflect grain falling from the thresher rotor;
   plural accelerator rolls disposed beneath the plural distribution augers;
   a shoe comprising a pan, the pan disposed beneath the plural accelerator rolls; and
   plural sensors disposed between the plural accelerator rolls and the pan positioned in an arrangement parallel to said transverse rotation axis and extending into a stream of crop material that impacts the pan so as to sense said stream of crop material and generate a signal indicative of a transverse loading of said crop material on the pan.

2. The combine harvester sensing system of claim 1, wherein the plural sensors are of the same type.

3. The combine harvester sensing system of claim 1, wherein the plural sensors are secured to a frame of a combine harvester.

4. The combine harvester sensing system of claim 1, wherein the plural sensors are located closer to the plural accelerator rolls than to the pan.

5. The combine harvester sensing system of claim 1, further comprising a controller, the controller configured to receive signals from the plural sensors.

6. The combine harvester sensing system of claim 5, further comprising a user interface coupled to the controller, the controller configured to provide feedback to an operator of a combine harvester via the user interface, the feedback based on the signals received by the controller from the plural sensors.

7. The combine harvester sensing system of claim 6, wherein the user interface comprises a display screen, the display screen providing a graphic of transverse crop material load distribution on the shoe.

8. The combine harvester sensing system of claim 7, further comprising one or more operator controls that enable the operator to adjust a manner in which crop material is discharged from the thresher rotor based on the graphic.

9. The combine harvester sensing system of claim 5, wherein the controller automatically causes an adjustment in a manner in which crop material is discharged from the thresher rotor based on the signals received from the plural sensors.

10. A combine harvester sensing method for use with a combine harvester, the method comprising:
  propelling crop material between plural accelerator rolls;
  sensing transverse loading of the propelled crop material with a plurality of sensors positioned in a transverse arrangement with respect to the direction of travel of the combine harvester; and
  providing feedback of shoe load distribution based on the sensed crop material.

11. The combine harvester sensing method of claim 10, wherein providing the feedback comprises providing a graphic of the transverse shoe load distribution on a display screen.

* * * * *